US009593873B2

(12) United States Patent
Lundberg

(10) Patent No.: US 9,593,873 B2
(45) Date of Patent: Mar. 14, 2017

(54) MANIFOLD FOR A REFRIGERANT RECOVERY DEVICE AND METHOD

(71) Applicant: Service Solutions U.S. LLC, Warren, MI (US)

(72) Inventor: Dylan Lundberg, Lonsdale, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 422 days.

(21) Appl. No.: 13/841,600

(22) Filed: Mar. 15, 2013

(65) Prior Publication Data

US 2014/0260400 A1 Sep. 18, 2014

(51) Int. Cl.

| | |
|---|---|
| ***F25D 19/00*** | (2006.01) |
| ***F25B 45/00*** | (2006.01) |
| ***E03B 1/00*** | (2006.01) |
| ***F16K 47/08*** | (2006.01) |
| ***F16K 1/44*** | (2006.01) |
| ***F16K 3/26*** | (2006.01) |
| *F17C 13/04* | (2006.01) |

(52) U.S. Cl.

CPC .............. *F25B 45/00* (2013.01); *F17C 13/04* (2013.01); *F25B 2345/002* (2013.01); *F25B 2345/006* (2013.01); *Y10T 137/87917* (2015.04)

(58) Field of Classification Search

CPC .. F25B 41/003; F25B 2345/006; F25B 45/00; F16K 15/18

USPC ........ 137/614.2, 625.33, 35, 38, 77; 62/299, 62/298

See application file for complete search history.

(56) References Cited

U.S. PATENT DOCUMENTS 4,671,488 A * 6/1987 Zeuner ................ F16K 31/0655 137/625.33
4,805,416 A * 2/1989 Manz et al. .................... 62/292
4,862,913 A * 9/1989 Wildfang .............. F16K 15/063 137/516.29
5,339,642 A * 8/1994 Laukhuf ................. F25B 45/00 141/198
6,189,561 B1 * 2/2001 Burke ...................... F16K 31/50 137/454.5
6,206,044 B1 * 3/2001 Gluf, Jr. ................... 137/625.65
6,328,275 B1 * 12/2001 Yang ..................... F16K 31/406 137/487.5
7,163,188 B1 * 1/2007 Sisk .................... F16K 31/0689 251/129.19
2006/0236704 A1 * 10/2006 Valcavi ................ G07C 5/0808 62/129
2008/0276634 A1 * 11/2008 Brown et al. ................... 62/149
2009/0050222 A1 * 2/2009 Jackson ................ F15B 11/042 137/625.65
2010/0154442 A1 * 6/2010 Schoenoff et al. ............... 62/77

* cited by examiner

*Primary Examiner* — M. Alexandra Elve
*Assistant Examiner* — Paul Alvare
(74) *Attorney, Agent, or Firm* — Baker Hostetler LLP

(57) ABSTRACT

A manifold assembly includes a solenoid valve, a manifold, and a check valve. The manifold has an inlet bore and an outlet bore. The check valve has a first end and a second end. The first end is configured to directly mate with the solenoid valve. The second end is configured to directly mate to the manifold. The second end has an inlet and an outlet. The inlet is in fluid communication with the inlet bore. The outlet is in fluid communication with the outlet bore.

10 Claims, 6 Drawing Sheets

MANIFOLD FOR A REFRIGERANT RECOVERY DEVICE AND METHOD

FIELD OF THE INVENTION

The disclosure generally relates to a refrigerant recovery unit. More particularly, the disclosure relates to an improved manifold and method of utilizing the improved manifold in the refrigerant recovery unit.

BACKGROUND OF THE INVENTION

Refrigerant recovery units or carts are used in connection with the service and maintenance of refrigeration systems, such as a vehicle's air conditioning system. The refrigerant recovery unit connects to the air conditioning system of the vehicle to recover refrigerant out of the system, separate out oil and contaminants from the refrigerant in order to recycle the refrigerant, and recharge the system with additional refrigerant. These operations are generally known as "servicing" the refrigeration system.

During servicing, flow paths for refrigerant may be opened and closed to accomplish the various operations. In some refrigerant recovery units, electronically controlled valves called, "solenoids" may be utilized to control the flow of refrigerant through the flow paths. Unfortunately, many solenoids generally have insufficient closing force to completely stop the flow of refrigerant in some instances.

Accordingly, it is desirable to provide a device and method capable of overcoming the disadvantages described herein at least to some extent.

SUMMARY OF THE INVENTION

The foregoing needs are met, to a great extent, by the present invention, wherein in some respects an improved manifold and method of utilizing the improved manifold in a refrigerant recovery unit is provided.

An embodiment of the present invention pertains to a manifold assembly. The manifold assembly includes a solenoid valve, a manifold, and a check valve. The manifold has an inlet bore and an outlet bore. The check valve has a first end and a second end. The first end is configured to directly mate with the solenoid valve. The second end is configured to directly mate to the manifold. The second end has an inlet and an outlet. The inlet is in fluid communication with the inlet bore. The outlet is in fluid communication with the outlet bore.

Another embodiment of the present invention relates to a refrigerant recovery unit. The refrigerant recovery unit includes a refrigerant storage unit, a refrigerant circuit, a manifold, a processor, and a memory. The refrigerant storage unit is configured to store a refrigerant. The refrigerant circuit is in fluid connection with a refrigeration system. The refrigerant circuit is configured to recover refrigerant from the refrigeration system and recharge the refrigeration system with the refrigerant. The manifold assembly includes a solenoid valve, a manifold, and a check valve. The solenoid valve is configured to control a flow of the refrigerant in the refrigeration circuit. The manifold has an inlet bore and an outlet bore. The check valve having a first end and a second end. The first end is configured to directly mate with the solenoid valve. The second end is configured to directly mate to the manifold. The second end has an inlet and an outlet. The inlet is in fluid communication with the inlet bore. The outlet is in fluid communication with the outlet bore. The processor is configured to control the solenoid valve. The memory is to store diagnostic software and operating software to operate the refrigerant recovery unit.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

According to various embodiments described herein, an improved manifold assembly is provided that is easier and less expensive to manufacture and is less bulky as compared to conventional manifold assemblies. The manifold assembly is particularly suitable for use with a refrigerant recovery unit to service a refrigeration system. As used herein, the term, "servicing" refers to any suitable procedure performed on a refrigeration or air conditioning system such as, for example, recovering refrigerant, recharging refrigerant into the refrigeration system, testing refrigerant, leak testing the refrigeration system, recovering the lubricant, replacing the lubricant, and the like. In conventional manifolds, passages are machined into the manifold to accept a conventional check valve and another passage is machined into the manifold to accept the solenoid valve. As shown herein, embodiments of the disclosure facilitate the elimination of the passage for the check valve. This allows the manifold to be reduced in size as well as having fewer machining operations. As a result, material and machining costs are reduced. An embodiment of the manifold assembly disclosed herein may be used to improve manufacturing procedures by reducing machining operations. In this or other embodiments, the efficiencies gained by the reduced machining operations may be utilized to reduce overall cost of products incorporating the improved manifold assembly and/or increasing profits from the sale of such produces. This improved manifold assembly is particularly beneficial to refrigerant recovery units that have limited internal volume as the improved manifold assembly may be made smaller and/or more compact as compared to conventional manifold assemblies having similar capabilities.

Figure 1:
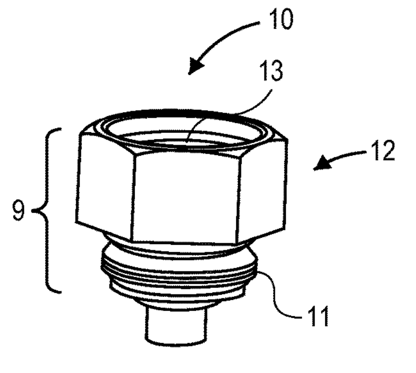
FIG. 1 is a perspective view of a check valve in accordance with an embodiment.

Embodiments will now be described with reference to the drawing figures, in which like reference numerals refer to like parts throughout. FIG. 1 is a perspective view of a check valve 10 in accordance with an embodiment. As shown in FIG. 1, the check valve 10 includes a body 12. According to various embodiments, the body 12 is configured to house a one-way valve. In addition, the body 12 is configured to mate with a solenoid valve and a manifold as shown herein. In this regard, the check valve 10 may include any suitable mating surfaces 9. In the particular example shown, the body 12 includes an externally threaded portion 11 and an internally threaded portion 13. However, in other examples, the body 12 may include press fit surfaces, gluing, brazing, or welding surfaces or the like.

Figure 2:
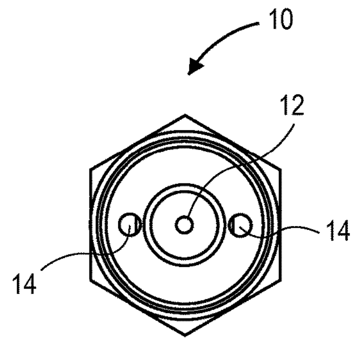
FIG. 2 is a top view of the check valve in accordance with the embodiment of FIG. 1.

FIG. 2 is a top view of the check valve 10 in accordance with the embodiment of FIG. 1. As shown in FIG. 2, the check valve 10 includes one or more inlet 14 and an outlet 16. The inlet 14 and outlet 16 may be disposed in any suitable location in the body 12. In general, the location of the inlet 14 and outlet 16 is based upon the particular solenoid valve and manifold configuration. Of note, the check valve 10 may serve as an adapter to facilitate utilizing a variety of different solenoid valves with a single manifold. That is, by modifying the mating surface 9 of the body 12 that mates with a solenoid 26 (shown in FIG. 4), different solenoids may be mated to a manifold without changing the machining procedures of the manifold 30 (shown in FIGS. 6 and 7).

Figure 3:
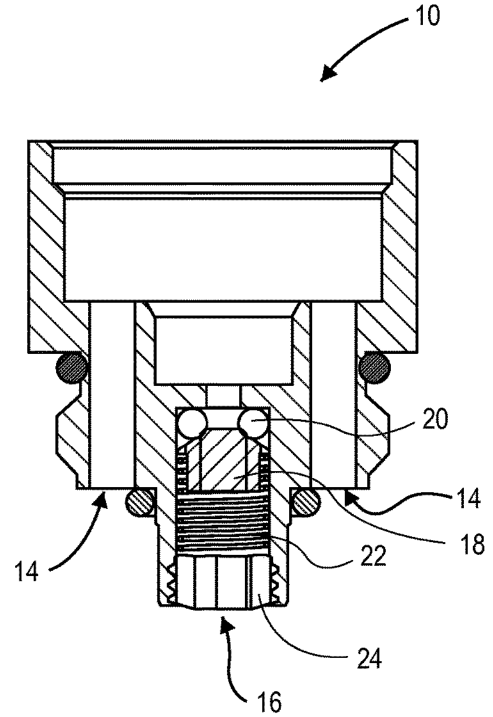
FIG. 3 is a cut away view of the check valve in accordance with the embodiment of FIG. 1.

FIG. 3 is a cut away view of the check valve 10 in accordance with the embodiment of FIG. 1. As shown in FIG. 3, the check valve 10 includes a poppet 18 configured to seat against an O-ring 20 to form a seal configured to reduce or prevent fluid from flowing into the outlet 16 and out the inlet 14. The check valve 10 further includes a biasing device such as a spring 22 to urge the poppet 18 against the O-ring 20. To retain the spring 22, O-ring 20, and poppet 18, a follower 24 may be threaded into the body 12. The follower 24 includes a passage disposed therethrough to allow fluid to flow out the outlet 16. In addition, the check valve 10 includes any suitable number of seals to fluidly seal the check valve 10 to the solenoid 26 (shown in FIG. 4) and/or the manifold 30 (shown in FIG. 6).

Figure 4:
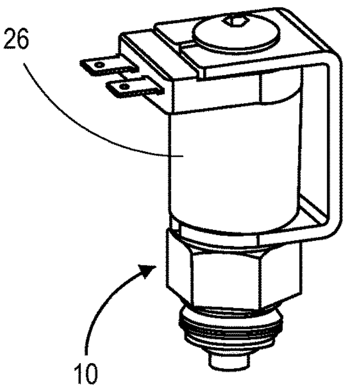
FIG. 4 is a perspective view of a suitable solenoid valve mated to the check valve in accordance with the embodiment of FIG. 1.

FIG. 4 is a perspective view of a suitable solenoid valve 26 mated to the check valve 10 in accordance with the embodiment of FIG. 1. As shown in FIG. 4, the check valve 10 is threaded or otherwise affixed to the lower portion of the solenoid valve 26 to mate with the valve portion of the solenoid valve 26. In this or other embodiments, the check valve 10 may be essentially the same diameter as the solenoid valve 26 to facilitate ease of attachment to the manifold 30 shown in FIG. 7.

Figure 5:
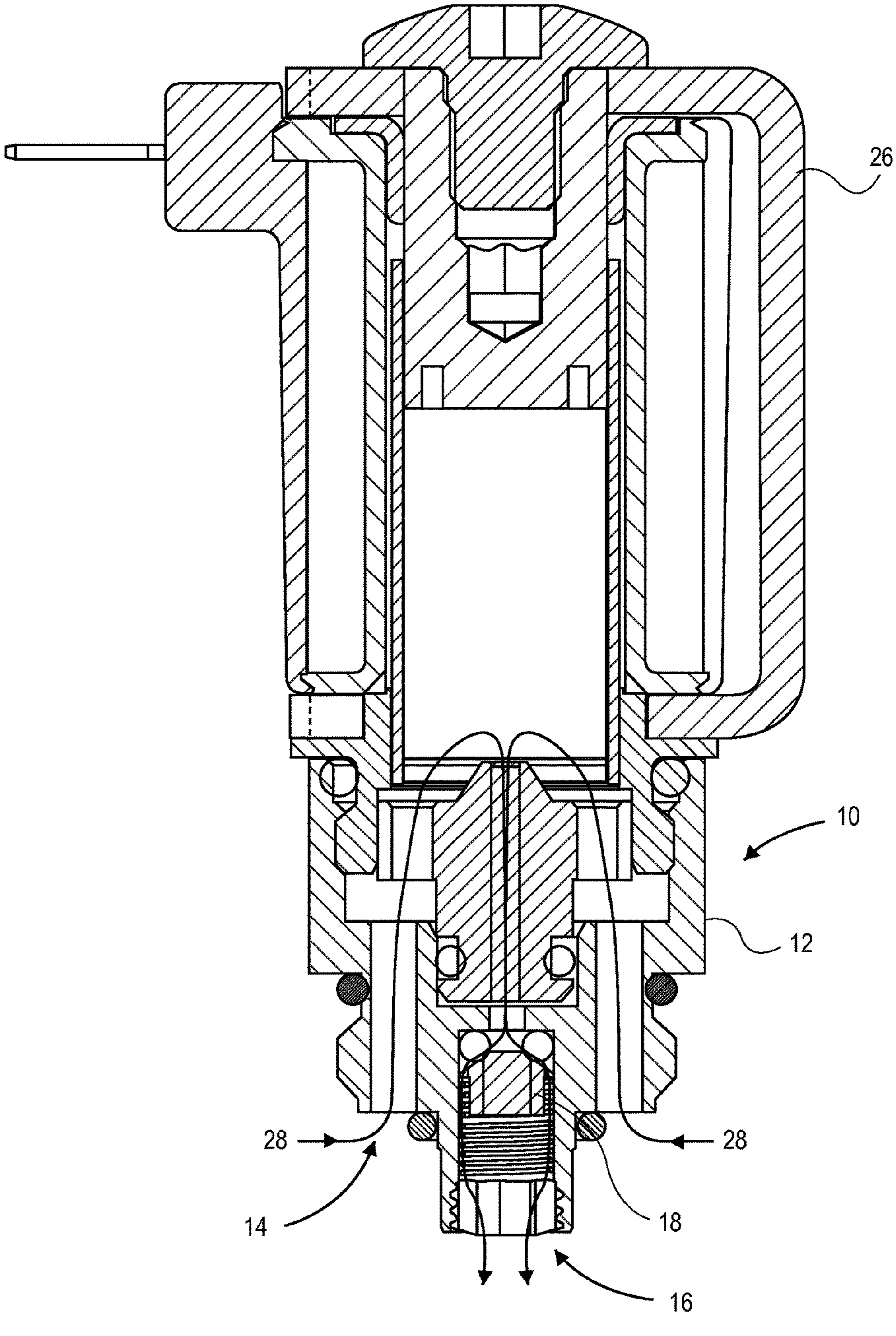
FIG. 5 is a cut away view of the suitable solenoid valve mated to the check valve in accordance with the embodiment of FIG. 1.

FIG. 5 is a cut away view of the suitable solenoid valve 26 mated to the check valve 10 in accordance with the embodiment of FIG. 1. As shown in FIG. 5, the solenoid 26 and the check valve 10 are mated to provide the solenoid 26 with sufficient backflow prevention to be utilized with a refrigerant recovery unit. In this and other applications, conventional solenoid valves may not sufficiently prevent backflow due to the relatively high pressures involved. As is generally known, solenoid valves such as the solenoid valve 26 employ an electromagnet (not shown) to move a plunger (not shown). By energizing and de-energizing the electromagnet, the solenoid valve 26 may be used to control the flow of fluid therethrough as shown by flow lines 28. However, a spring (not shown) in the solenoid 26 may be insufficiently strong to prevent backflow.

Figure 6:
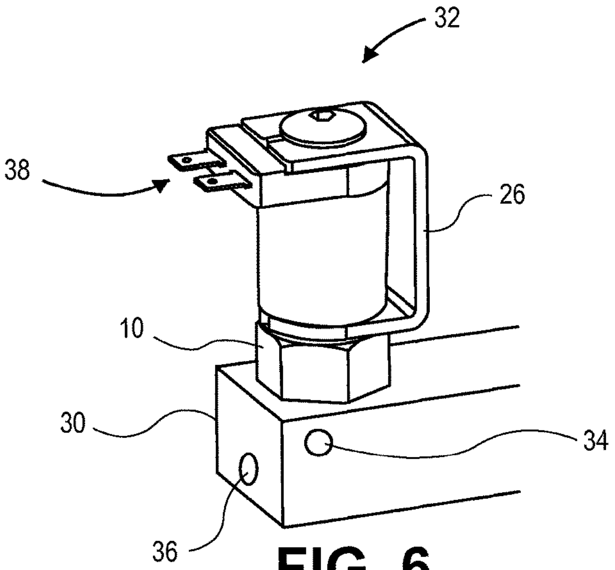
FIG. 6 is a perspective view of a manifold assembly in accordance with an embodiment.
Figure 9:
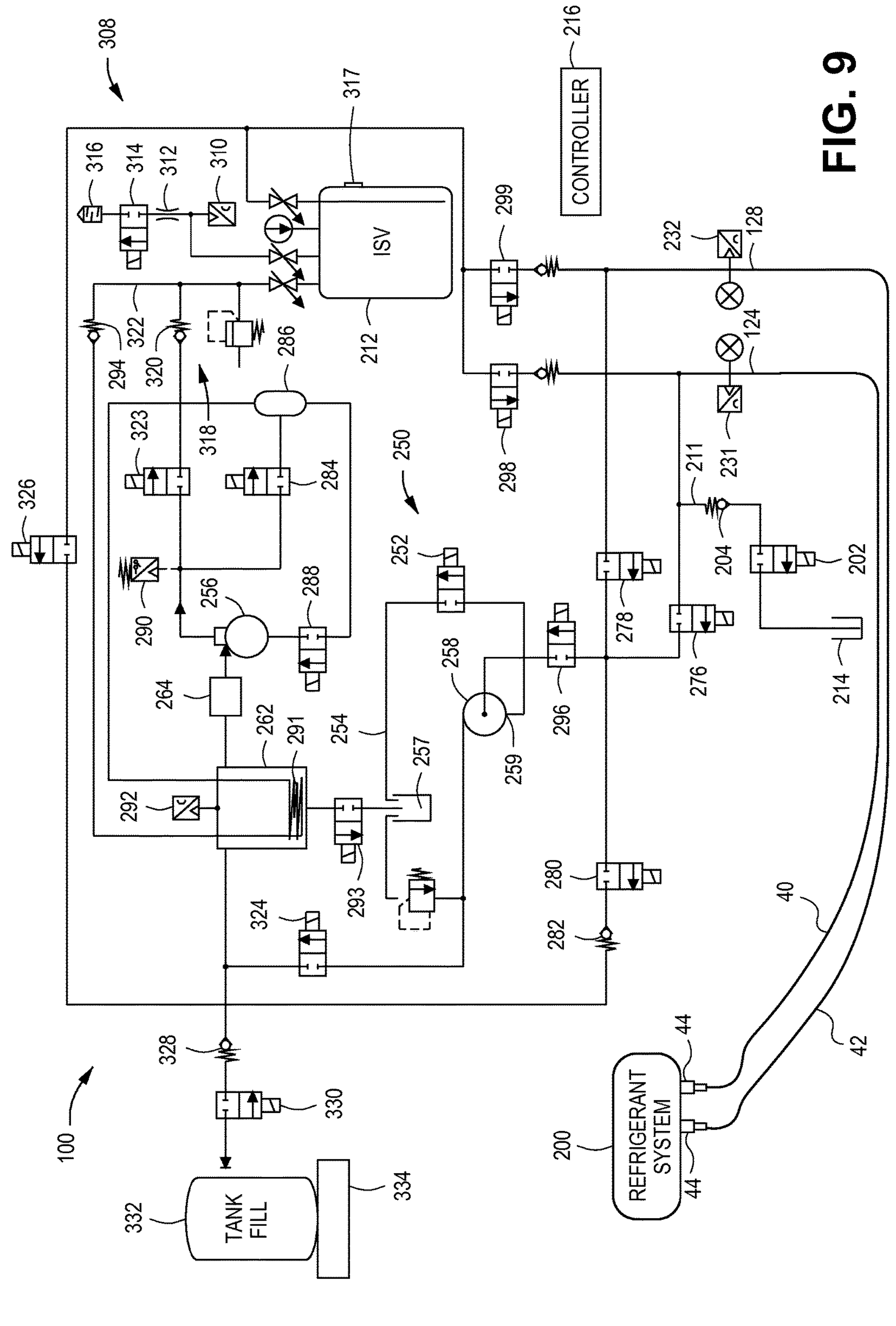
FIG. 9 is a schematic diagram illustrating components of the refrigerant recovery unit shown in FIG. 8.
Figure 10:
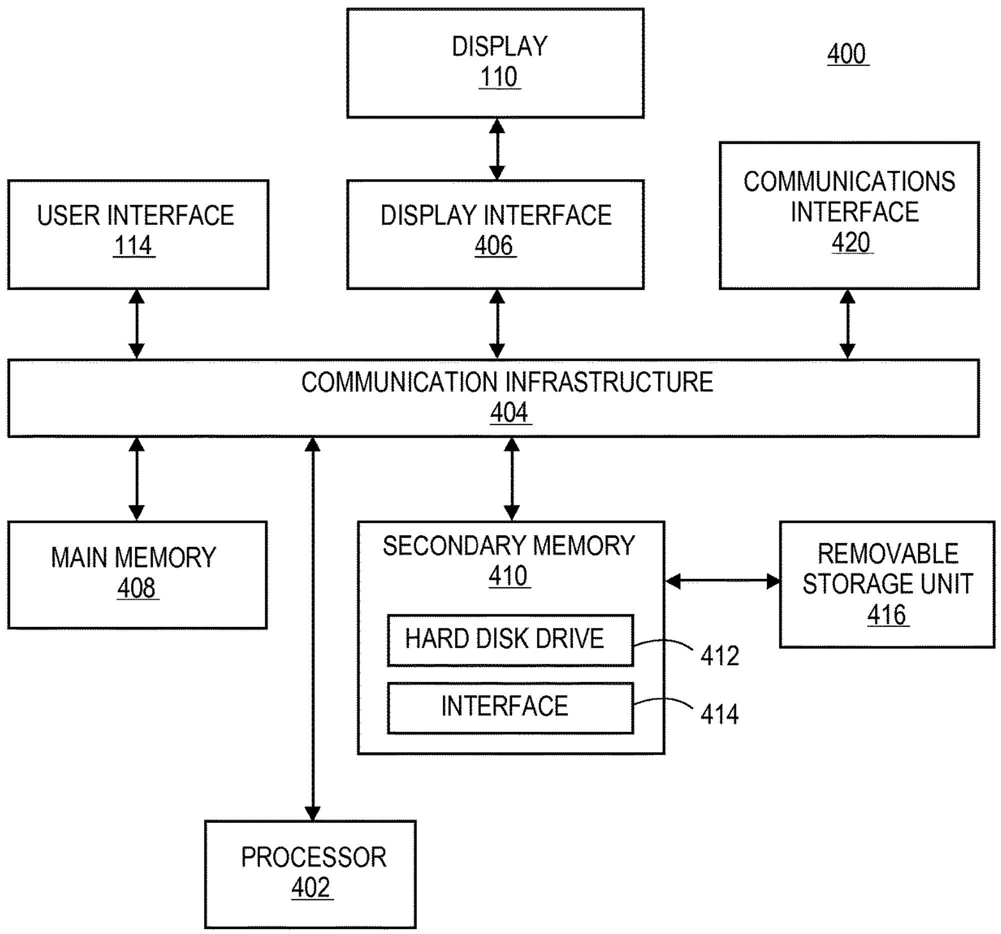
FIG. 10 is a block diagram illustrating aspects of a control system for the refrigerant recovery unit of FIG. 8.

FIG. 6 is a perspective view of the check valve 10 mated to the solenoid valve 26 and mated to a manifold 30 to form a manifold assembly 32 in accordance with an embodiment. As shown in FIG. 6, the manifold assembly 32 includes an inlet bore 34 and outlet bore 36. The check valve 10 and the solenoid valve 26 are configured to control the flow of fluid passing from the inlet bore 34 to the outlet bore 36 and reduce or prevent backflow from the outlet bore 36 to the inlet bore 34. To control the normal flow of fluid, the solenoid valve 26 includes leads 38 to energize the solenoid valve 26. As shown in FIGS. 9 and 10, a controller is utilized to control the solenoid valve 26 by energizing (and de-energizing) the leads 38.

Figure 7:
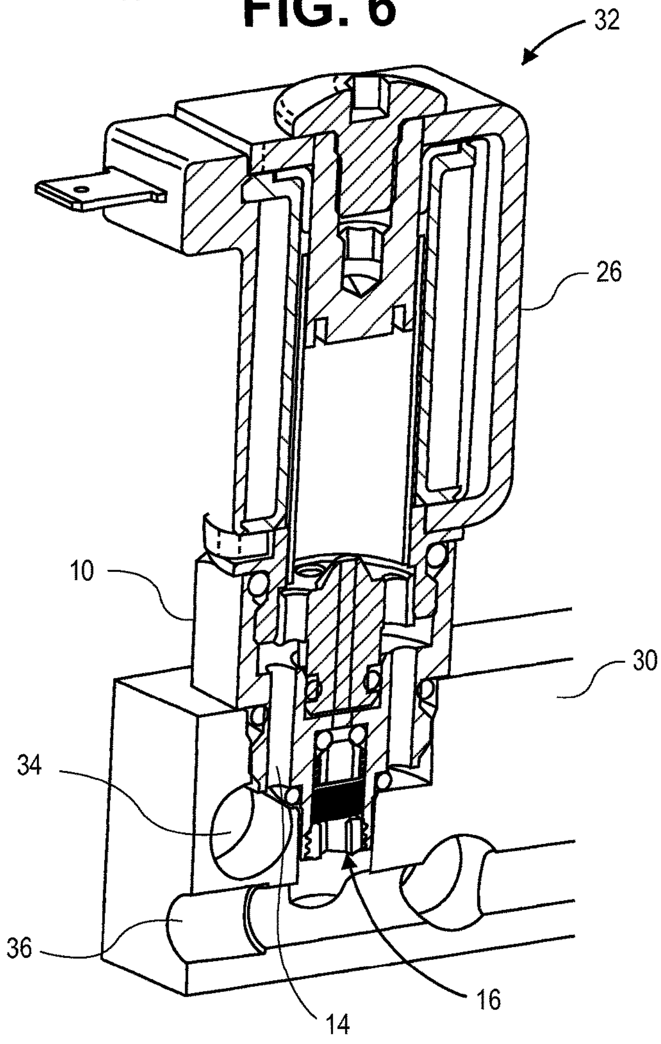
FIG. 7 is a cut away view of a manifold assembly in accordance with the embodiment of FIG. 6.

FIG. 7 is a cut away view of a manifold assembly 32 in accordance with the embodiment of FIG. 6. As shown in FIG. 7, the inlet bore 34 is configured to provide a passage to the inlet 14 and the outlet bore 36 is configured to provide a passage from the outlet 16. More generally, the inlet 14 is in fluid communication with the inlet bore 34 and the outlet 16 is in fluid communication with the outlet bore 36. It is an advantage of the manifold assembly 32 that the check valve 10 and the solenoid valve 26 utilize a single passage in the manifold 30 and this passage may be disposed very close to the edge and sides of the manifold 30. In conventional manifold assemblies, the solenoid must be disposed further from the edge or sides of the manifold to accommodate the check valve formed in the manifold.

Figure 8:
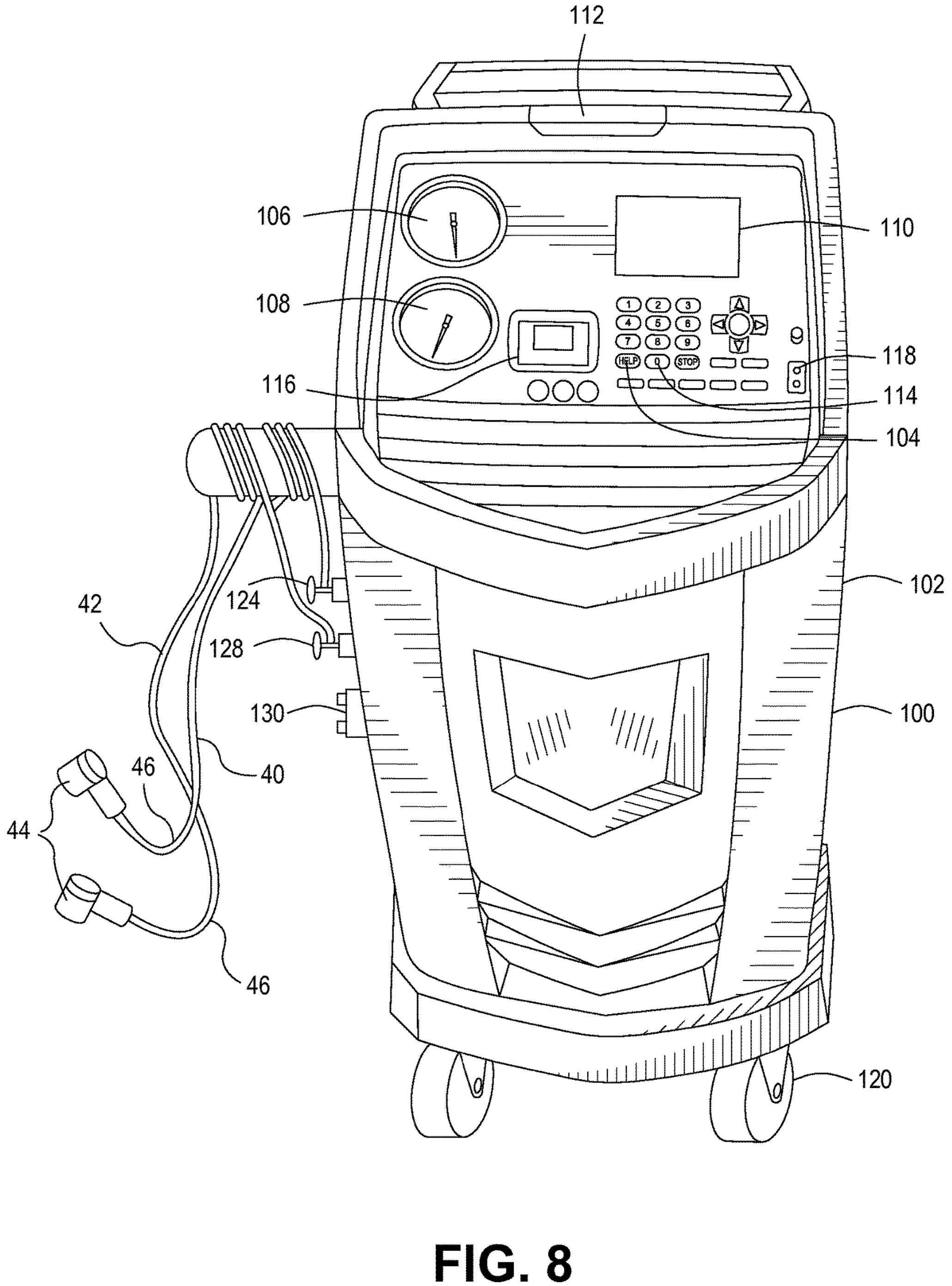
FIG. 8 is a perspective view of a refrigerant recovery unit suitable for use with the manifold assembly in accordance with FIG. 6.

FIG. 8 is a perspective view of a refrigerant recovery unit 100 suitable for use with the manifold assembly 32 in accordance with FIG. 6. As shown in FIG. 8, a refrigerant recovery unit 100 includes a pair of hoses 40 and 42. One or both of the pair of service hoses 40 and 42 includes a service coupler 44 and hose 46. The service coupler 44 is configured to mate with a port or coupler of a refrigeration system such as the refrigeration system 200 shown in FIG. 9. In various embodiments, the refrigeration system may include any suitable device, unit, or system having a supply of refrigerant therein. Examples of suitable refrigeration systems include a standalone air conditioning or de-humidifying unit and/or a unit disposed within a vehicle, device, appliance, structure, or the like. A vehicle can be any suitable vehicle, such as an automobile, train, airplane, boat, ship and the like. Suitable devices or appliances may include, for example, an air conditioning unit, dehumidifier, ice maker, refrigerator/freezer, beverage dispenser, ice cream maker, and the like.

The refrigerant recovery unit 100 can be the AC1234™ from ROBINAIR® based in Owatonna, Minn. (Service Solutions U.S., LLC). The refrigerant recovery unit 100 includes a cabinet 102 to house components of the system (See FIG. 9). The cabinet 102 may be made of any suitable material such as thermoplastic, steel and the like.

The cabinet 102 includes a control panel 104 that allows the user to operate the refrigerant recovery unit 100. The control panel 104 may be part of the cabinet as shown in FIG. 1 or separated. The control panel 104 includes high and low gauges 106, 108, respectively. For the purposes of this disclosure, the terms, "high" and "low" generally refer to the high and low pressure sides of a refrigeration system, respectively. The gauges may be analog or digital. The control panel 104 has a display 110 to provide information to a user. The information may include, for example, operating status of the refrigerant recovery unit 100 or provide messages or menus to the user. The control panel 104 may include indicators 112 to indicate to the user the operational status of the refrigerant recovery unit 100. If included, the indicators 112 may include light emitting diodes (LEDs) or the like, that when activated, may indicate that the refrigerant recovery unit 100 is in the recovery, recycling or recharging mode or indicate that the filter needs to be changed or that there is a malfunction.

According to an embodiment, the control panel 104 includes a user interface 114 to provide the user with an interface to interact and operate the refrigerant recovery unit 100. The user interface 114 may include any suitable interface such as, for example, an alphanumeric keypad, directional arrows, function keys, pressure or touch sensitive display, and the like. Optionally, a printer 116 is provided to print out information, such as test results.

The cabinet 102 further includes a plurality of attachment points 124 and 128 for the service hoses 40, 42 that connect the refrigerant recovery unit 100 to a refrigerant containing device, such as a refrigeration system (shown in FIG. 9). Also shown in FIG. 8, a vehicle connector interface 130 is provided so that a communication cable can be connected from the vehicle connector interface to a data link connector in a vehicle (not shown in FIG. 8). This allows the refrigerant recovery unit 100 to communicate with the vehicle and diagnose any issues with it. In order for the refrigerant recovery unit 100 to be mobile, one or more wheels 120 are provided at a bottom portion of the cabinet 102.

During servicing of a refrigeration system (shown in FIG. 9), if it is determined that the refrigerant therein should be recovered and then recharged, the refrigerant recovery unit 100 may be connected to the refrigeration system via the service hoses 40 and 42. More particularly, the respective service coupler 44 of each of the service hoses 40 and 42 is used to fluidly connect the refrigeration system to the refrigerant recovery unit 100. For example, the refrigerant may be conveyed through the service hoses 40 and 42 in response to the refrigeration system being connected to the refrigerant recovery unit 100.

FIG. 9 is a schematic diagram illustrating components of the refrigerant recovery unit 100 shown in FIG. 8. In general, the refrigerant recovery unit 100 is configured to facilitate testing, removing, and recharging refrigerant and/or lubricant in a refrigeration system 200. More particularly, the refrigerant recovery system 10 is configured to recover the refrigerant quickly and efficiently and the refrigerant recovery system 10 is configured to recharge the refrigeration system 200 accurately. In the following description, the terms, "solenoid" and "valves" are used interchangeably and some or all of these devices may include the check valve 10 and solenoid valve 26. Furthermore, some or all of these flow control devices may be disposed in the manifold assembly 32 (shown in FIGS. 6 and 7). The solenoid valves 26 disposed in the manifold assembly 32 are operable to be controlled by a controller 216 to open and close and thereby control a flow of refrigerant therethrough. As described herein, the refrigerant recovery unit 100 includes upwards of 15 solenoid valves and many of these solenoid valves include associated check valves. By providing a low profile integrated check valve such as the check valve 10, the manifold 30 (shown in FIGS. 6 and 7) may be made smaller and with fewer machining operations.

In the particular example shown, the refrigerant recovery unit 100 is coupled to the refrigeration system 200 via the service hose 40 (high side) and the service hose 42 (low side). In general, the various hoses and couplers are configured to be closed until they are coupled to the refrigerant recovery unit 100 and/or the refrigeration system 200. In this manner, refrigerant leakage may be minimized or prevented.

The recovery cycle is initiated by the opening of high pressure and low-pressure solenoids 276, 278, respectively. This allows the refrigerant within the vehicle's refrigeration system 200 to flow through the service hoses 40 and 42 and then through a recovery valve 280 and a check valve 282. The service hoses 40 and 42 provide minimal restriction to the flow of refrigerant during recovery which allows the refrigerant to boil off and be efficiently drawn from the refrigeration system 200. To continue, the refrigerant flows from the check valve 282 into a system oil separator 262, where it travels through a filter/dryer 264, to an input of a compressor 256. Refrigerant is drawn through the compressor 256 through a normal discharge valve 284 and through a compressor oil separator 286, which circulates oil back to the compressor 256 through an oil return valve 288. The refrigerant recovery unit 100 may include a high-pressure switch 290 in communication with the controller 216, which is programmed to determine an upper pressure limit, for example, 435 psi, to optionally shut down the compressor 256 to protect the compressor 256 from excessive pressure. The controller 216 can also be, for example, a microprocessor, a field programmable gate array (FPGA) or application-specific integrated circuit (ASIC). The controller 216 via a wired or wireless connection (not shown) controls the various valves and other components (e.g. vacuum, compressor) of the refrigerant recovery unit 100. In some embodiments of the present disclosure, any or all of the electronic solenoid or electrically activated valves such as the solenoid valve 26 may be connected and controlled by the controller 216.

A high-side clear valve 323 may optionally be coupled to the output of the compressor 256 to release the recovered refrigerant transferred from compressor 256 directly into a storage tank 212, instead of through a path through the normal discharge valve 284.

The heated compressed refrigerant exits the oil separator 286 and then travels through a loop of conduit or heat exchanger 291 for cooling or condensing. As the heated refrigerant flows through the heat exchanger 291, the heated refrigerant gives off heat to the cold refrigerant in the system oil separator 262, and assists in maintaining the temperature in the system oil separator 262 within a working range. Coupled to the system oil separator 262 is a switch or transducer 292, such as a low pressure switch or pressure transducer, for example, that senses pressure information, and provides an output signal to the controller 216 through a suitable interface circuit programmed to detect when the pressure of the recovered refrigerant is down to 13 inches of mercury, for example. An oil separator drain valve 293 drains the recovered oil into a container 257. Finally, the recovered refrigerant flows through a normal discharge check valve 294 and into the storage tank 212.

The evacuation cycle begins by the opening of high pressure and low-pressure solenoids 276 and 278 and valve 296, leading to the input of a vacuum pump 258. Prior to opening valve 296, an air intake valve (not shown) is opened, allowing the vacuum pump 258 to start exhausting air. The vehicle's refrigeration system 200 is then evacuated by the closing of the air intake valve and opening the valve 296, allowing the vacuum pump 258 to exhaust any trace gases remaining until the pressure is approximately 29 inches of mercury, for example. When this occurs, as detected by pressure transducers 231 and 232, optionally, coupled to the high side 226 and low side 230 of the vehicle's refrigeration system 200 and to the controller 216, the controller 216 turns off valve 296 and this begins the recharging cycle. Here again, the minimal restriction to flow from the refrigeration system 200 provided by the service hoses 40 and 42 facilitate efficient evacuation of the refrigeration system 200.

The recharging cycle begins by opening charge valve 298 to allow the refrigerant in storage tank 212, which is at a pressure of approximately 70 psi or above, to flow into the service hose 40. Once sufficient refrigerant pressure has developed within the service hose 40 to overcome the cracking pressure, the refrigerant is allowed to flow through the respective check valve assembly 18 and then through the high side of the vehicle's refrigeration system 200. The flow is through charge valve 298 for a period of time programmed to provide a full charge of refrigerant to the vehicle. The full charge of the refrigerant is based on the manufacturer's refrigerant amount recommendation plus the weight of refrigerant remaining in the service hose 40. Because the service hose 40 is configured to maintain the refrigerant in the liquid state and the internal volume of the service hose 40 is known, the weight of refrigerant remaining in the service hose 40 is readily determinable. Optionally, charge valve 299 may be opened to charge the low side. The charge valve 299 may be opened alone or in conjunction with charge valve 298 to supply a flow of refrigerant to the service hose 42. In a manner similar to the service hose 40, the service hose 42 is configured to retain the refrigerant until the predetermined cracking pressure is reached before allowing the refrigerant to pass through the respective check valve assembly 18 and then charge the vehicle's refrigeration system 200. The storage tank 212 may be disposed on a scale (not shown) that measures the weight of the refrigerant in the storage tank.

Following recharging, any refrigerant remaining in the service hoses 40 and/or 42 may be recovered. For example, the user may be instructed to remove the service couplers 44 from the refrigeration system 200 so that refrigerant is not drawn out of the refrigeration system 200. Once the service couplers 44 have been removed, a recovery cycle as described herein may be performed to remove any remaining refrigerant in the service hoses 40 and/or 42.

Other components shown in FIG. 9 include an oil inject circuit having an oil inject valve 202 and an oil inject hose or line 211. The oil inject hose 211 is one example of a fluid transportation means for transmitting oil for the refrigerant recovery unit 100. The oil inject hose 211 may be one length of hose or multiple lengths of hose or tubing or any other suitable means for transporting fluid. The oil inject hose 211 connects on one end to an oil inject bottle 214 and on the other end couples to the refrigerant circuit in the refrigerant recovery unit 100. Disposed along the length of the oil inject hose 211 are the oil inject valve 202 and an oil check valve 204. The oil inject path follows from the oil inject bottle 214, through the oil inject valve 202, to the junction with the high side charge line, and to the vehicle's refrigeration system 200.

FIG. 9 also illustrates a vacuum pump oil drain circuitry 250 that includes a vacuum pump oil drain valve 252 that is located along a vacuum pump oil drain conduit 254 connecting a vacuum pump oil drain outlet 259 to the container 257 for containing the drained vacuum pump oil. The vacuum pump oil drain valve 252 may be an electronically activated solenoid valve controlled by controller 216. The connection may be a wireless or wired connection. In other embodiments the valve 252 may be a manually activated valve and manually actuated by a user. The conduit 254 may be a flexible hose or any other suitable conduit for provided fluid communication between the outlet 259 and the container 257.

FIG. 9 also illustrates an air purging apparatus 308. The air purging apparatus 308 allows the refrigerant recovery unit 100 to be purged of non-condensable, such as air. Air purged from the refrigerant recovery unit 100 may exit the storage tank 212, through an orifice 312, through a purging valve 314 and through an air diffuser 316. In some embodiments, the orifice may be 0.028 of an inch. A pressure transducer 310 may measure the pressure contained within the storage tank 212 and purge apparatus 308. The pressure transducer 310 may send the pressure information to the controller 216. Based upon the pressure information, the controller 216 may initiate purging if it is determined the pressure is too high, as calculated by the controller. The valve 314 may be selectively actuated to permit or not permit the purging apparatus 308 to be open to the ambient conditions. A temperature sensor 317 may be coupled to the main tank to measure the refrigerant temperature therein. The placement of the temperature sensor 317 may be anywhere on the tank or alternatively, the temperature sensor may be placed within a refrigerant line 322. The measured temperature and pressure may be used to calculate the ideal vapor pressure for the type of refrigerant used in the refrigerant recovery unit. The ideal vapor pressure can be used to determine when the non-condensable gases need to be purged and how much purging will be done in order for the refrigerant recovery unit to function properly.

High side clearing valves 318 may be used to clear out part of the high-pressure side of the system. The high side clearing valves 318 may include valve 323 and check valve 320. As described herein, the valve 323 and some or all valves disclosed herein may be a solenoid valve such as the solenoid valve 26 mated to the check valve 10. When it is desired to clear part of the high side, valve 323 is opened. Operation of the compressor 256 will force refrigerant out of the high pressure side through valves 323 and 320 and into the storage tank 212. During this procedure the normal discharge valve 284 may be closed.

A deep recovery valve 324 is provided to assist in the deep recovery of refrigerant. When the refrigerant from the refrigeration system 200 has, for the most part, entered into the refrigerant recovery unit 100, the remaining refrigerant may be extracted from the refrigeration system 200 by opening the deep recovery valve 324 and turning on the vacuum pump 258.

In another embodiment, in order to charge the refrigeration system 200, the power charge valve 326 may be opened and a tank fill structure 332 may be used. Alternatively or in addition to, the tank fill structure 332 may also be used to fill the storage tank 212. In order to obtain refrigerant from a refrigerant source, the refrigerant recovery unit 100 may include the tank fill structure 332, and valves 328 and 330. The tank fill structure 332 may be configured to attach to a refrigerant source. The valve 330 may be a solenoid valve such as the solenoid valve 26 and the valve 328 may be a check valve such as the check valve 10.

When it is desired to allow refrigerant from a refrigerant source to enter the refrigerant recovery unit 100, the tank fill structure 332 is attached to the refrigerant source and the tank fill valve 330 is opened. The check valve 328 prevents refrigerant from the refrigerant recovery unit 100 from flowing out of the refrigerant recovery unit 100 through the tank fill structure 332. When the tank fill structure 332 is not connected to a refrigerant source, the tank fill valve 330 is kept closed. The tank fill valve 330 may be connected to and controlled by the controller 216.

The tank fill structure 332 may be configured to be seated on the scale 334 configured to weigh the tank fill structure 332 in order to determine an amount of refrigerant stored in the tank fill structure 332. The scale 334 may be operatively coupled to the controller 216 and provide a measurement of a weight of the tank fill structure 332 to the controller 216. The controller 216 may cause a display of the weight of the tank fill structure 332 on the display 110.

Aspects of the refrigerant recovery unit 100 may be implemented via control system 400 using software or a combination of software and hardware. In one variation, aspects of the present invention may be directed toward a control system 400 capable of carrying out the functionality described herein. An example of such a control system 400 is shown in FIG. 10.

FIG. 10 is a block diagram illustrating aspects of a control system for the refrigerant recovery unit of FIG. 8. As shown in FIG. 10, the control system 400 may be integrated with the controller 216 to permit, for example, automation of the recovery, evacuation, and recharging processes and/or manual control over one or more of each of the processes individually. In one embodiment, the control system 400 allows the refrigerant recovery unit 100 to direct communicate and diagnose the vehicle under service. In another embodiment, the control system 400 allows for communication with a diagnostic tool, such as a vehicle communication interface (VCI), that is coupled to the vehicle under service. It should be understood that the VCI does not have to be coupled to a vehicle in order to communicate with the refrigerant recovery unit 100. This allows the refrigerant recovery unit 100 to receive information from the vehicle such as VIN (vehicle identification number), manufacturer, make, model, and odometer information, and vehicle sensor data that pertains to the heating, ventilation, and air conditioning sensors and systems on the vehicle. Data could include A/C and heating, ventilation, and air conditioning (HVAC) system sensor readings, A/C and HVAC related diagnostic trouble codes, system pressures, and interactive tests, like actuating of various components, such as a fan control. All of this data and information would be displayed on the display 110 of the refrigerant recovery unit 100. Menu selections, diagnostic trouble codes, and interactive tests may be displayed and certain diagnostic may be performed using the refrigerant recovery unit.

The control system 400 may also provide access to a configurable database of vehicle information so the specifications pertaining to a particular vehicle, for example, may be used to provide exacting control and maintenance of the functions described herein. The control system 400 may include a processor 402 connected to a communication infrastructure 404 (e.g., a communications bus, cross-over bar, or network). The various software and hardware features described herein are described in terms of an exemplary control system. A person skilled in the relevant art(s) will realize that other computer related systems and/or architectures may be used to implement the aspects of the disclosed invention.

The control system 400 may include a display interface 406 that forwards graphics, text, and other data from memory and/or the user interface 114, for example, via the communication infrastructure 404 for display on the display 110. The communication infrastructure 404 may include, for example, wires for the transfer of electrical, acoustic and/or optical signals between various components of the control system and/or other well-known means for providing communication between the various components of the control system, including wireless means. The control system 400 may include a main memory 408, preferably random access memory (RAM), and may also include a secondary memory 410. The secondary memory 410 may include a hard drive 412 or other devices for allowing computer programs including diagnostic database (DTC information and repair and diagnostic information) or other instructions and/or data to be loaded into and/or transferred from the control system 400. Such other devices may include an interface 414 and a removable storage unit 416, including, for example, a Universal Serial Bus (USB) port and USB storage device, a program cartridge and cartridge interface (such as that found in video game devices), a removable memory chip (such as an erasable programmable read only memory (EPROM), or programmable read only memory (PROM)) and associated socket, and other removable storage units 416 and interfaces 414.

The control system 400 may also include a communications interface 420 for allowing software and data to be transferred between the control system 400 and external devices. Examples of a communication interfaces include a modem, a network interface (such as an Ethernet card), a communications port, wireless transmitter and receiver, BLUETOOTH®, near field communication (NFC), Wi-Fi, infra-red, cellular, satellite, a Personal Computer Memory Card International Association (PCMCIA) slot and card, etc.

The control system 400 also includes transceivers and signal translators necessary to communicate with the vehicle electronic control units in various communication protocols, such as J1850 (VPM and PWM), international standards organization (ISO) 9141-2 signal, communication collision detection (CCD) (e.g., Chrysler collision detection), data communication links (DCL), serial communication interface (SCI), Controller Area Network (CAN), Keyword 2000 (ISO 14230-4), on-board diagnostics (OBD) II or other communication protocols that are implemented in a vehicle. This allows the refrigerant recovery unit to communicate directly with the vehicle without the VCI (e.g., directly connected to the vehicle) or while the VCI is simply acting as a pass through.

A software program (also referred to as computer control logic) may be stored in main memory 408 and/or secondary memory 410. Software programs may also be received through communications interface 420. Such software programs, when executed, enable the control system 400 to perform the features of the present invention, as discussed herein. In particular, the software programs, when executed, enable the processor 402 to perform the features of the present invention. Accordingly, such software programs may represent controllers of the control system 400.

In variations where the invention is implemented using software, the software may be stored in a computer program product and loaded into control system 400 using hard drive 412, removable storage unit 416, and/or the communications interface 420. The control logic (software), when executed by the processor 402, causes the controller 216, for example, to perform the functions of the invention as described herein. In another variation, aspects of the present invention can be implemented primarily in hardware using, for example, hardware components, such as application specific integrated circuits (ASICs), field programmable gate array (FPGA). Implementation of the hardware state machine so as to perform the functions described herein will be apparent to persons skilled in the relevant art(s).

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A manifold assembly comprising:

a solenoid valve;

a manifold having an inlet bore and an outlet bore; and a check valve having:

a first end configured to directly mate with the solenoid valve, a first inlet passage and a second inlet passage, both the first inlet passage and the second inlet passage being aligned parallel to a central axis of the check valve and both the first inlet passage and the second inlet passage being configured to provide a conduit for a fluid to flow from the inlet bore to the solenoid valve;

an O-ring, a poppet, and a spring disposed in a check valve outlet bore, the check valve outlet bore being threaded to accept a follower configured to retain the poppet and the spring within the check valve outlet bore, the check valve outlet bore being disposed between the first inlet passage and the second inlet passage and extending further out from the check valve than the first inlet passage and the second inlet passage, the check valve outlet bore being in alignment with the central axis of the check valve and between the first inlet passage and the second inlet passage and the first inlet passage and the second inlet passage extending further along the check valve outlet bore than the O-ring and poppet, the O-ring, the poppet, and the spring being disposed downstream of the solenoid valve and configured to allow a unidirectional flow of the fluid from the solenoid valve to the outlet bore, the spring biasing the poppet to seal against the O-ring; and a second end configured to directly mate to the manifold, the second end having an outlet disposed downstream of the O-ring, the poppet, and the spring and the outlet being in alignment with the central axis of the check valve, the outlet being in fluid communication with the outlet bore.

2. A refrigerant recovery unit, comprising:

a refrigerant storage unit configured to store a refrigerant;

a refrigerant circuit in fluid connection with a refrigeration system, the refrigerant circuit configured to recover refrigerant from the refrigeration system and recharge the refrigeration system with the refrigerant;

a manifold assembly comprising:

a solenoid valve configured to control a flow of the refrigerant in the refrigeration circuit;

a manifold having an inlet bore and an outlet bore;

a check valve having:

a first end configured to directly mate with the solenoid valve, a first inlet passage and a second inlet passage, both the first inlet passage and the second inlet passage being aligned parallel to a central axis of the check valve and both the first inlet passage and the second inlet passage being configured to provide a conduit for the refrigerant to flow from the inlet bore to the solenoid valve;

an O-ring, a poppet, and a spring disposed in a check valve outlet bore, the check valve outlet bore being threaded to accept a follower configured to retain the poppet and the spring within the check valve outlet bore, the check valve outlet bore being disposed between the first inlet passage and the second inlet passage and extending further out from the check valve than the first inlet passage and the second inlet passage, the check valve outlet bore being in alignment with the central axis of the check valve and between the first inlet passage and the second inlet passage and the first inlet passage and the second inlet passage extending further along the check valve outlet bore than the O-ring and poppet, the O-ring, the poppet, and the spring being disposed downstream of the solenoid valve and configured to allow a unidirectional flow of the refrigerant from the solenoid valve to the outlet bore, the spring biasing the poppet to seal against the O-ring; and a second end configured to directly mate to the manifold, the second end having an outlet disposed downstream of the O-ring, the poppet, and the spring and the outlet being in alignment with the central axis of the check valve, the outlet being in fluid communication with the outlet bore;

a processor configured to control the solenoid valve;

a vehicle connector interface to communicate between a vehicle and the processor; and a memory to store diagnostic software and operating software to operate the refrigerant recovery unit.

3. The manifold assembly according to claim 1, further comprising:

a threaded portion disposed at the first end to mate with the solenoid valve.

4. The manifold assembly according to claim 1, further comprising:

a threaded portion disposed at the second end to mate with the manifold.

5. The manifold assembly according to claim 1, further comprising:

a plurality of solenoids, each solenoid having a respective check valve.

6. The manifold assembly according to claim 1, wherein the outlet is disposed through the follower.

7. The refrigerant recovery unit according to claim 2, further comprising:

a threaded portion disposed at the first end to mate with the solenoid valve.

8. The refrigerant recovery unit according to claim 2, further comprising:

a threaded portion disposed at the second end to mate with the manifold.

9. The refrigerant recovery unit according to claim 2, further comprising:

a plurality of solenoids, each solenoid having a respective check valve.

10. The refrigerant recovery unit according to claim 2, wherein the outlet is disposed through the follower.

* * * * *